(12) United States Patent
Yamamoto

(10) Patent No.: US 9,758,056 B2
(45) Date of Patent: Sep. 12, 2017

(54) FUEL CELL HUMIDIFICATION DEVICE AND FUEL CELL MOTORCYCLE

(71) Applicant: SUZUKI MOTOR CORPORATION, Hamamatsu-shi, Shizuoka (JP)

(72) Inventor: Tomoharu Yamamoto, Hamamatsu (JP)

(73) Assignee: SUZUKI MOTOR CORPORATION, Hamamatsu-shi (JP)

( * ) Notice: Subject to any disclaimer, the term of this patent is extended or adjusted under 35 U.S.C. 154(b) by 72 days.

(21) Appl. No.: 15/066,377

(22) Filed: Mar. 10, 2016

(65) Prior Publication Data

US 2016/0276682 A1    Sep. 22, 2016

(30) Foreign Application Priority Data

Mar. 16, 2015 (JP) .................. 2015-052359

(51) Int. Cl.
| | |
|---|---|
| *B60L 11/18* | (2006.01) |
| *H01M 8/04828* | (2016.01) |
| *H01M 8/04313* | (2016.01) |
| *H01M 8/04119* | (2016.01) |
| *H01M 8/04223* | (2016.01) |
| *H01M 8/04492* | (2016.01) |
| *H01M 8/043* | (2016.01) |

(Continued)

(52) U.S. Cl.
CPC .......... *B60L 11/1881* (2013.01); *B62K 11/10* (2013.01); *H01M 8/043* (2016.02); *H01M 8/0485* (2013.01); *H01M 8/04179* (2013.01); *H01M 8/04231* (2013.01); *H01M 8/04313* (2013.01); *H01M 8/04492* (2013.01); *B62K 2204/00* (2013.01); *H01M 8/04753* (2013.01); *H01M 16/006* (2013.01); *H01M 2220/20* (2013.01); *H01M 2250/20* (2013.01); *Y02T 90/32* (2013.01)

(58) Field of Classification Search
CPC . B60L 11/1881; H01M 8/043; B62K 2204/00
See application file for complete search history.

(56) References Cited

U.S. PATENT DOCUMENTS

| | | | |
|---|---|---|---|
| 7,223,487 B2 | 5/2007 | Morita | ........................... 429/13 |
| 7,798,269 B2 * | 9/2010 | Makuta | ............... H01M 8/2475 180/220 |

(Continued)

FOREIGN PATENT DOCUMENTS

| | | |
|---|---|---|
| JP | 2004-296339 A | 10/2004 |
| JP | 2009-43687 A | 2/2009 |

*Primary Examiner* — Kevin Hurley
(74) *Attorney, Agent, or Firm* — Stein IP, LLC

(57) ABSTRACT

There is provided a fuel cell humidification device of a fuel cell motorcycle. When a fuel cell managing device demands to perform a humidification treatment for humidifying an electrolyte film of an air-cooled type solid polymer fuel cell or the humidification treatment is being performed, a humidification permission deciding portion decides whether an inclination of the fuel cell motorcycle is equal to or greater than an inclination threshold, and then permits to perform or continue to perform the humidification treatment if the inclination is not equal to or greater than the inclination threshold, and does not permit to perform or continue to perform the humidification treatment if the inclination is equal to or greater than the inclination threshold.

6 Claims, 8 Drawing Sheets

(51) Int. Cl.
*B62K 11/10* (2006.01)
*H01M 16/00* (2006.01)
*H01M 8/04746* (2016.01)

(56) References Cited

U.S. PATENT DOCUMENTS 9,543,598 B2 * 1/2017 Otsuka ................ B60L 11/1898
2004/0191585 A1   9/2004 Morita ........................... 429/13
2007/0248857 A1 * 10/2007 Kurosawa ......... H01M 8/04029
                                                          429/413

* cited by examiner

FIG. 5

| SPEED(km) TIME(SEC) | 0 | 5 | 10 | 15 | 20 | 25 | 30 | 35 | 40 | 45 | 50 | 55 | 60 | 65 | 70 | 75 |
|---|---|---|---|---|---|---|---|---|---|---|---|---|---|---|---|---|
| 0 | 15 | 10 | 20 | 20 | 15 | 15 | 10 | 10 | 10 | 10 | 10 | 0 | 0 | 0 | 0 | 0 |
| 5 | 15 | 10 | 20 | 15 | 15 | 10 | 10 | 10 | 10 | 5 | 5 | 0 | 0 | 0 | 0 | 0 |
| 10 | 15 | 10 | 15 | 15 | 15 | 10 | 10 | 10 | 5 | 0 | 0 | 0 | 0 | 0 | 0 | 0 |
| 15 | 15 | 10 | 10 | 10 | 10 | 10 | 5 | 5 | 0 | 0 | 0 | 0 | 0 | 0 | 0 | 0 |
| 20 | 15 | 10 | 10 | 10 | 5 | 5 | 0 | 0 | 0 | 0 | 0 | 0 | 0 | 0 | 0 | 0 |
| 25 | 15 | 10 | 10 | 5 | 0 | 0 | 0 | 0 | 0 | 0 | 0 | 0 | 0 | 0 | 0 | 0 |
| 30 | 15 | 10 | 10 | 0 | 0 | 0 | 0 | 0 | 0 | 0 | 0 | 0 | 0 | 0 | 0 | 0 |
| 35 | 15 | 5 | 5 | 0 | 0 | 0 | 0 | 0 | 0 | 0 | 0 | 0 | 0 | 0 | 0 | 0 |
| 40 | 15 | 0 | 0 | 0 | 0 | 0 | 0 | 0 | 0 | 0 | 0 | 0 | 0 | 0 | 0 | 0 |
| 45 | 15 | 0 | 0 | 0 | 0 | 0 | 0 | 0 | 0 | 0 | 0 | 0 | 0 | 0 | 0 | 0 |
| 50 | 15 | 0 | 0 | 0 | 0 | 0 | 0 | 0 | 0 | 0 | 0 | 0 | 0 | 0 | 0 | 0 |
| 55 | 15 | 0 | 0 | 0 | 0 | 0 | 0 | 0 | 0 | 0 | 0 | 0 | 0 | 0 | 0 | 0 |
| 60 | 15 | 0 | 0 | 0 | 0 | 0 | 0 | 0 | 0 | 0 | 0 | 0 | 0 | 0 | 0 | 0 |

B

FUEL CELL HUMIDIFICATION DEVICE AND FUEL CELL MOTORCYCLE

CROSS-REFERENCE TO RELATED APPLICATIONS

The disclosure of Japanese Patent Application No. 2015-052359 filed on Mar. 16, 2015, including specification, drawings and claims is incorporated herein by reference in its entirety.

TECHNICAL FIELD

The present invention relates to a fuel cell humidification device for humidifying an electrolyte film of an air-cooled type solid polymer fuel cell, and to a fuel cell motorcycle having the fuel cell humidification device mounted therein.

BACKGROUND

Recently, a fuel cell motorcycle which is a motorcycle having a solid polymer fuel cell mounted therein is being developed. The fuel cell motorcycle is run by rotating a motor with an electric power generated by the solid polymer fuel cell and thus driving a driving wheel. The solid polymer fuel cell is a device which generates electricity by reacting hydrogen supplied to a fuel electrode with air (oxygen) supplied to an air electrode (oxygen electrode) via a solid polymer electrolyte film. Such a fuel cell motorcycle is described in Patent Documents 1 and 2.

Also, the solid polymer fuel cell includes water-cooled and air-cooled types depending on a cooling method of heat generated during reaction. In general, the water-cooled type fuel cell has a compressor, a cooling water duct, a radiator, a humidifier and the like as a cooling mechanism and realizes cooling by these instruments. Contrarily, the air-cooled type fuel cell can realize cooling while eliminating the instruments. If an electric power generated by the fuel cell is 20 kW or less, a volume of a cooling mechanism in the air-cooled type is smaller than that in the water-cooled type. Accordingly, in small vehicles such as fuel cell motorcycles, the air-cooled type fuel cell is commonly mounted therein.

Further, in order to allow the solid polymer fuel cell to continuously generate electricity, hydrogen is converted to hydrogen ion and then the hydrogen ion has to penetrate the solid polymer electrolyte film. Therefore, the electrolyte film needs to be wetted. In the water-cooled type fuel cell, air to be supplied to the fuel cell is humidified by the humidifier, thereby maintaining a wet state of the electrolyte film. On the other hand, in the air-cooled type fuel cell, humidification of the electrolyte film is performed using moisture generated by reaction therein. Specifically, when the electrolyte film of the air-cooled type fuel cell is humidified, an inlet and an outlet of a path through which air flows are closed by shutters or the like and a fan creating a flow of the air is stopped. Thus, the vapor and the reaction water are stayed in the electrolyte film, thereby humidifying the electrolyte film.

Patent Document 1: Japanese Patent Application Publication No. 2009-043687A
Patent Document 2: Japanese Patent Application Publication No. 2004-296339A The fuel cell motorcycle having the air-cooled type solid polymer fuel cell mounted therein has the following problems.

In other words, upon cornering of the motorcycle, an inclination and a speed of a vehicle body are adjusted so that the centrifugal force and the gravity exerted on the vehicle body are balanced with each other, thereby balancing the vehicle body and thus stabilizing running thereof. For example, when a lateral inclination of the vehicle body is excessively increased upon cornering, an accelerator (throttle) is opened to increase a speed, so that the centrifugal force exerted on the vehicle body is increased and thus the inclination of the vehicle body is decreased, thereby balancing the vehicle body. Accordingly, in the motorcycle, a state where an output of the motor can be sufficiently increased instantly in response to opening of the accelerator by a driver upon cornering has to be ensured.

However, in the air-cooled type solid polymer fuel cell, as described above, humidification of the electrolyte film is performed by blocking air to be supplied to the fuel cell. Accordingly, during performing of such a humidification treatment, the fuel cell becomes a state where generation of electricity is almost stopped, and accordingly an output of the motor using an electric power from the fuel cell is inevitably reduced. Therefore, in the fuel cell motorcycle, if the humidification treatment is performed upon cornering, a state where an output of the motor cannot be sufficiently increased even when the accelerator is opened is likely to be occurred. As a result, it is difficult to balance the vehicle body with only an electric power from the fuel cell upon cornering, thereby damaging stability of running.

Meanwhile, in the fuel cell motorcycle, the motor can be also driven with an electric power from the secondary battery, but in general, a capacity of the secondary battery in the fuel cell motorcycle is not large. Accordingly, when the motor is driven with an electric power from the secondary battery, a magnitude or duration of an output of the motor is limed as compared with a case where the motor is driven with an electric power from the fuel cell. Therefore, it is difficult to fully leave stability of running upon cornering to driving of the motor with an electric power supplied from the secondary battery.

The above problems can be also occurred in situations where it is important to balance the vehicle body by operation of the accelerator, other than upon cornering.

SUMMARY

It is therefore an object of the present invention to provide a fuel cell humidification device and a fuel cell motorcycle, which can prevent stability of running from being damaged due to performing of a humidification treatment for humidifying an electrolyte film of a fuel cell.

According to an aspect of the embodiments of the present invention, there is provided a fuel cell humidification device of a fuel cell motorcycle, the fuel cell motorcycle including: a frame forming a skeleton of the fuel cell motorcycle; a driving wheel for driving the fuel cell motorcycle; a steerable wheel for changing a running direction of the fuel cell motorcycle; a fuel tank supported on the frame and configured to store hydrogen; an air-cooled type solid polymer fuel cell supported on the frame and having a fuel electrode, an air electrode and an electrolyte film; a secondary battery supported on the frame; a motor supported on the frame and configured to be operated with an electric power supplied from the fuel cell or the secondary battery and to drive the driving wheel; an electric power control device configured to control supplying of an electric power from the fuel cell to the motor and supplying of an electric power from the secondary battery to the motor; and a fuel cell managing device configured to detect or predict a wet condition of the electrolyte film of the fuel cell and then on the basis of the detection or prediction result, demand to perform a humidification treatment for humidifying the electrolyte film of the fuel cell, and the fuel cell humidification devices including: a humidification performing portion configured to perform the humidification treatment; an inclination detection portion configured to detect an inclination of the fuel cell motorcycle; and a humidification permission deciding portion configured to decide whether or not to permit to perform the humidification treatment, on the basis of the inclination of the fuel cell motorcycle, detected by the inclination detection portion, wherein when the fuel cell managing device demands to perform the humidification treatment or the humidification treatment is being performed, the humidification permission deciding portion decides whether or not the inclination of the fuel cell motorcycle, detected by the inclination detection portion is equal to or greater than an inclination threshold, and then permits to perform or continue to perform the humidification treatment if the inclination of the fuel cell motorcycle is not equal to or greater than the inclination threshold, and does not permit to perform or continue to perform the humidification treatment if the inclination of the fuel cell motorcycle is equal to or greater than the inclination threshold.

According to the fuel cell humidification device, when an inclination of the fuel cell motorcycle upon cornering of the fuel cell motorcycle is equal to or greater than an inclination threshold, a humidification treatment is not performed even if the fuel cell managing device demands to perform the humidification treatment. Also, when the humidification is being performed, the humidification treatment is stopped if the inclination of the fuel cell motorcycle becomes equal to or greater than the inclination threshold due to cornering of the fuel cell motorcycle. In this way, because performing the humidification treatment is avoided upon cornering of the fuel cell motorcycle, a state where an output of the motor can be sufficiently increased instantly in response to opening of the accelerator by a driver upon cornering can be obtained. Thus, stability of running can be ensured upon cornering (or other situations where it is important to balance the vehicle body by operation of the accelerator).

Also, the fuel cell humidification device may further include a humidification time measuring portion configured to measure a humidification time which is a duration of the humidification treatment, wherein in a case where the humidification treatment is being performed, when deciding whether or not to permit to continue to perform the humidification treatment on the basis of the inclination of the fuel cell motorcycle, detected by the inclination detection portion, the humidification permission deciding portion causes the inclination threshold to be used in the decision to become smaller as the humidification time measured by the humidification time measuring portion becomes longer.

In this configuration, the humidification permission deciding portion decides whether or not to permit to perform or continue to perform the humidification treatment on the basis of the inclination of the fuel cell motorcycle and the humidification time. Specifically, at the humidification time becomes long, the inclination threshold to be used in the decision is set to be smaller. Namely, if the humidification time is short, decision is carried out using a larger inclination threshold than an inclination threshold used when the humidification time is longer, so that the humidification treatment can be stopped only when the fuel cell motorcycle is largely inclined. In other words, even when the fuel cell motorcycle is inclined during a short humidification time, the humidification treatment is continuously performed if a degree thereof is small.

Further, if the fuel cell motorcycle is inclined small during a short humidification time and correspondingly, a driver opens the accelerator in order to balance the vehicle body, an output of the motor can be increased using an electric power from the secondary battery. So long as an increase in output of the motor in accordance with operation of the accelerator by the driver can be obtained by an electric power from the secondary battery, the humidification treatment is continuously performed.

In this way, when the fuel cell motorcycle is inclined small during a short humidification time, the humidification treatment is continuously performed, thereby achieving to achieve an early and reliable humidification to the electrolyte film.

Further, the fuel cell humidification device may further include a vehicle speed detection portion configured to detect a speed of the fuel cell motorcycle, wherein in a case where the fuel cell managing device demands to perform the humidification treatment or the humidification treatment is being performed, when deciding whether or not to perform or continue to perform the humidification treatment on the basis of the inclination of the fuel cell motorcycle, detected by the inclination detection portion, the humidification permission deciding portion varies the inclination threshold to be used in the decision in accordance with the speed of the fuel cell motorcycle, detected by the vehicle speed detection portion.

In this configuration, the humidification permission deciding portion decides whether or not to permit to perform or continue to perform the humidification treatment on the basis of the inclination and speed of the fuel cell motorcycle. Specifically, the inclination threshold to be used in the decision is varied in accordance with a speed of the fuel cell motorcycle. Varying of the inclination threshold in accordance with the speed of the fuel cell motorcycle can be for example determined in consideration of the followings.

In other words, during performing of the humidification treatment, because the fuel cell becomes a state where generation of electricity is almost stopped, it is difficult to drive the motor with an electric power from the fuel cell. However, the motor can be driven with an electric power from the secondary battery. Originally, the secondary battery is a substitute electric power source for the motor, and thus an amount of electric power capable of being supplied to the motor from the secondary battery is limited. Accordingly, the humidification treatment upon cornering is permitted under a condition that an amount of electric power, which has to be supplied to the motor in accordance with operation of the accelerator in order to balance the vehicle body inclined due to cornering, falls within a range not exceeding an amount of electric power capable of being supplied to the motor from the secondary battery. When the condition is satisfied, stability of running can be ensured by driving the motor with an electric power from the secondary battery, even if the humidification treatment is permitted to be performed upon cornering.

In this case, as the inclination of the fuel cell motorcycle is increased upon cornering of the fuel cell motorcycle, an openness of the accelerator required to balance the vehicle body tends to be increased or a period of time during which the accelerator is opened tends to be increased. Namely, as the inclination of the fuel cell motorcycle is increased, an amount of electric power, which has to be supplied to the motor in accordance with operation of the accelerator in order to balance the vehicle body inclined due to cornering, is increased. If this point is considered, a range of inclination of the fuel cell motorcycle, within which even if the humidification treatment is performed upon cornering, stability of running can be ensured by driving the motor with an electric power from the secondary battery, can be determined.

Also, the range of inclination can be varied in accordance with a speed of the fuel cell motorcycle. For example, as the speed of the fuel cell motorcycle is increased, a rotation velocity of the motor is increased and thus an amount of electric power, which has to be supplied to the motor, is also increased. Accordingly, as the speed of the fuel cell motorcycle is increased, the range of inclination of the fuel cell motorcycle, within which stability of running can be ensured by driving the motor with an electric power from the secondary battery upon cornering, becomes narrow. Thus, if the speed of the fuel cell motorcycle is higher, the inclination threshold is preferably set to be smaller.

Also, when the speed of the fuel cell motorcycle is a very low speed, running can be easily unstable and also even if the inclination of the fuel cell motorcycle due to cornering is small, the accelerator is likely to have to be largely opened in order to balance the vehicle body. Accordingly, when the speed of the fuel cell motorcycle is a very low speed, an amount of electric power, which has to be supplied to the motor in accordance with operation of the accelerator in order to balance the vehicle body, is increased even if a degree of inclination of the fuel cell motorcycle is small. Therefore, when the speed of the fuel cell motorcycle is a very low speed, the range of inclination of the fuel cell motorcycle, within which stability of running can be ensured by driving the motor with an electric power from the secondary battery upon cornering, becomes narrow. For this reason, when the speed of the fuel cell motorcycle is a very low speed, the inclination threshold is preferably set to be smaller.

In this way, because the inclination threshold to be used in the decision is varied in accordance with a speed of the fuel cell motorcycle, whether or not the humidification treatment has to be permitted can be accurately decided. Accordingly, the effect that stability of running can be enhanced by stopping the humidification treatment upon cornering and the effect that an opportunity to humidify the electrolyte film of the fuel cell can be increased by performing the humidification treatment even upon cornering can be realized in a good balance.

Further, the fuel cell humidification device may further include a humidification time measuring portion configured to measure a humidification time which is a duration of the humidification treatment, wherein in a case where the humidification treatment is being performed, when deciding whether or not to permit to continue to perform the humidification treatment on the basis of the speed of the fuel cell motorcycle, detected by the vehicle speed detection portion and the inclination of the fuel cell motorcycle, detected by the inclination detection portion, the humidification permission deciding portion causes the inclination threshold to be used in the decision to become smaller as the humidification time measured by the humidification time measuring portion becomes longer.

In this configuration, the humidification permission deciding portion decides whether or not to permit to perform or continue to perform the humidification treatment on the basis of the inclination and speed of the fuel cell motorcycle and the humidification time. Specifically, at the humidification time becomes long, the inclination threshold to be used in the decision is set to be smaller. Accordingly, whether or not the humidification treatment has to be permitted can be more accurately decided. Thus, it is possible to enhance stability of running upon cornering and also to increase an opportunity to humidify the electrolyte film of the fuel cell.

Further, the fuel cell humidification device may further include an inclination change detection portion configured to detect a change per unit time in inclination of the fuel cell motorcycle, wherein when the fuel cell managing device demands to perform the humidification treatment or the humidification treatment is being performed, the humidification permission deciding portion decides whether or not the change per unit time in inclination of the fuel cell motorcycle, detected by the inclination change detection portion is equal to or greater than an inclination change threshold, and then does not permit to perform or permit to continue to perform the humidification treatment if the change per unit time in inclination of the fuel cell motorcycle is equal to or greater than the inclination change threshold.

When an inclination of the fuel cell motorcycle is rapidly increased upon cornering, it is expected that the inclination of the fuel cell motorcycle will be instantaneously increased so that a balance of the vehicle body is greatly damaged. In this case, it is expected that a driver will instantly largely open the accelerator in order to balance the vehicle body. According to the above configuration, a change per unit time in inclination of the fuel cell motorcycle is detected and whether or not the detected change per unit time in inclination is equal to or greater than an inclination change threshold is decided, so that it can be recognized that the fuel cell motorcycle is rapidly inclined. Also, in this case, the humidification treatment is not performed or is stopped to allow an electric power from the fuel cell to be supplied to the motor, thereby ensuring a state where an output of the motor can be sufficiently increased in accordance with operation of the accelerator.

According to another aspect of the embodiments of the present invention, there is provided a fuel cell motorcycle including the fuel cell humidification device.

According to the fuel cell motorcycle, stability of running can be ensured upon cornering (or other situations where it is important to balance the vehicle body by operation of the accelerator).

According to the aspects of the embodiments of the present invention, stability of running of a fuel cell motorcycle can be prevented from being damaged due to performing of a humidification treatment for humidifying an electrolyte film of a fuel cell.

BRIEF DESCRIPTION OF THE DRAWINGS

In the accompanying drawings:

FIG. 5 is an explanatory view showing an inclination threshold map in the fuel cell motorcycle according to the first embodiment of the present invention;

DETAILED DESCRIPTION OF THE EMBODIMENTS

First Embodiment

Figure 1:
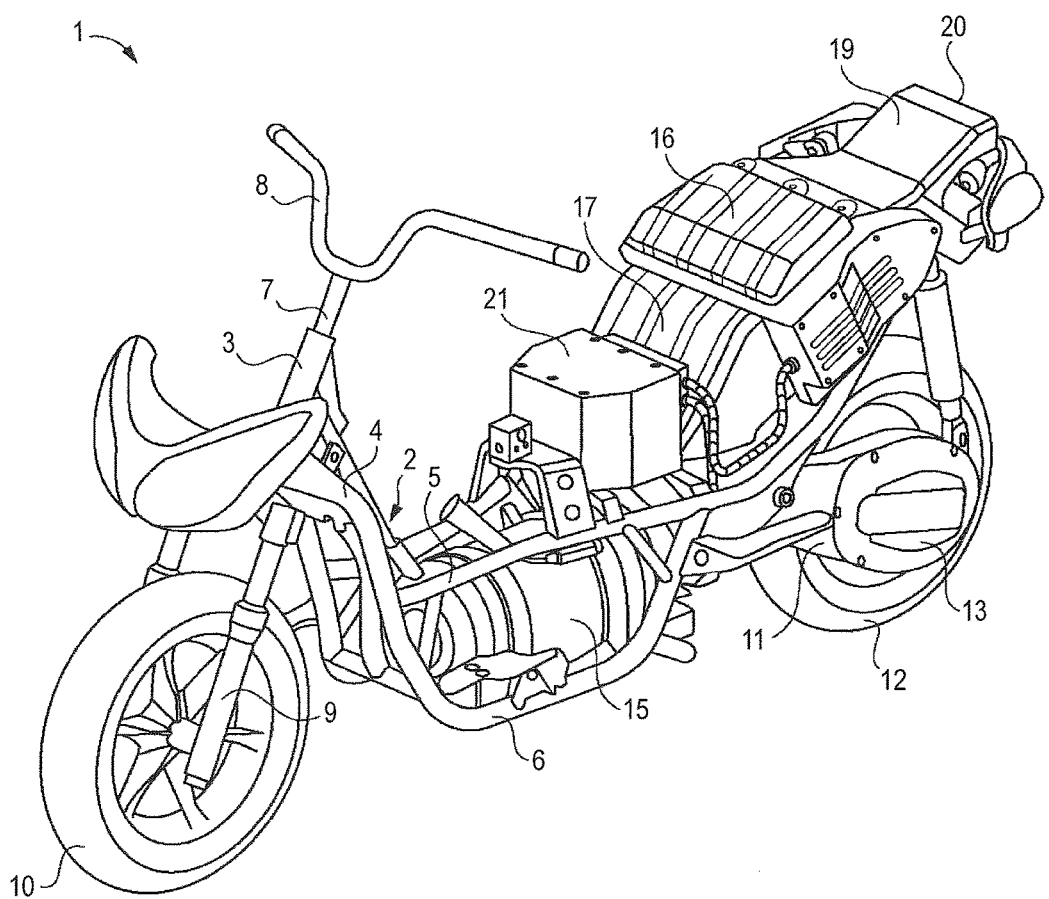
FIG. 1 is an explanatory view showing a fuel cell motorcycle according to a first embodiment of the present invention.
Figure 2:
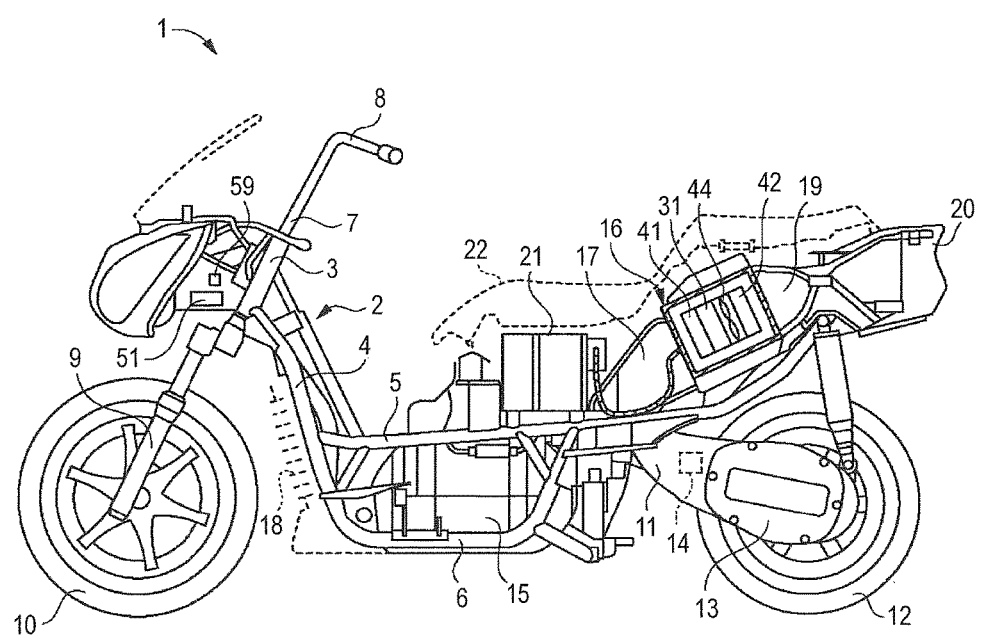
FIG. 2 is an explanatory view showing a fuel cell motorcycle according to the first embodiment of the present invention.

FIGS. 1 and 2 show a fuel cell motorcycle according to the first embodiment of the present invention. In FIG. 1, the fuel cell motorcycle 1 according to the first embodiment of the present invention is a motorcycle which has a fuel cell mounted therein and is configured to run by driving a motor using an electric power generated by the fuel cell.

A body frame 2 forming a skeleton of a vehicle body of the fuel cell motorcycle 1 includes a head pipe 3, a downtube 4, an upper frame 5 and a lower frame 6. The head pipe 3 is arranged on a front portion of the fuel cell motorcycle 1. The downtube 4 extends from a part of the head pipe 3 toward a lower portion of the fuel cell motorcycle 1. The upper frame 5 is connected, at a front end portion thereof, to a middle portion of the downtube 4 in a vertical direction, and on a rear end side thereof extends toward a rear portion of the fuel cell motorcycle 1. The lower frame 6 is connected, at a front end portion thereof, to a lower portion of the downtube 4, and on a rear end side thereof extends toward a middle portion of the fuel cell motorcycle 1 in a front and rear direction so that a rear end portion thereof is connected to the upper frame 5. A steering shaft 7 is supported on the head pipe 3, a handle 8 is provided on an upper portion of the steering shaft 7 and a front fork 9 is provided on a lower portion of the steering shaft 7. Also, a front wheel 10 as a steerable wheel for changing a running direction of the fuel cell motorcycle 1 is supported by the front fork 9.

As shown in FIG. 2, a swingable arm 11 is supported on a part of the upper frame 5, which is located more rearward than the middle portion thereof in the front and rear direction. A rear wheel 12 as a driving wheel for driving the fuel cell motorcycle 1 is supported on the swingable arm 11. Also, a motor 13 as an electric motor for driving the rear wheel 12 is provided on the swingable arm 11. The motor 13 is connected with an inverter 14 configured to convert each of a direct current supplied from the fuel cell 31 and a direct current supplied from a secondary battery 21 to an alternating current.

Further, a fuel tank 15 is provided in a lower part of the middle portion of the fuel cell motorcycle 1 in the front and rear direction and also between the front wheel 10 and the rear wheel 12. The fuel tank 15 is supported by the upper frame 5 and the lower frame 6. The fuel tank 15 is stored with hydrogen as a fuel for the fuel cell 31.

Also, a fuel cell device 16 including the fuel cell 31 is provided in a rear part of the fuel cell motorcycle 1 and also above the rear wheel 12. The fuel cell device 16 is supported on the upper frame 5. An intake duct 17 is provided in front of the fuel cell device 16, and an intake port 18 of the intake duct 17 is arranged in rear of the front wheel 10. Also, an exhaust duct 19 is provided in rear of the fuel cell device 16, and an exhaust port 20 of the exhaust duct 19 is arranged on a rear end portion of the fuel cell motorcycle 1.

Further, the secondary battery 21 is provided above the fuel tank 15. The secondary battery 21 is supported on the upper frame 5. As an electric power sources for driving the motor 13, the fuel cell 31 is the main and the secondary battery 21 is a substitute. The secondary battery 21 can be stored with an electric power generated by the motor 13 during deceleration of the fuel cell motorcycle 1 or an electric power generated in the fuel cell device 16.

Further, a seat 22 is arranged above the secondary battery 21 and the fuel cell device 16. In addition, a control unit 51 and an inclination detecting unit 59 are provided, for example, on an upper side of the front portion of the fuel cell motorcycle 1.

Figure 3:
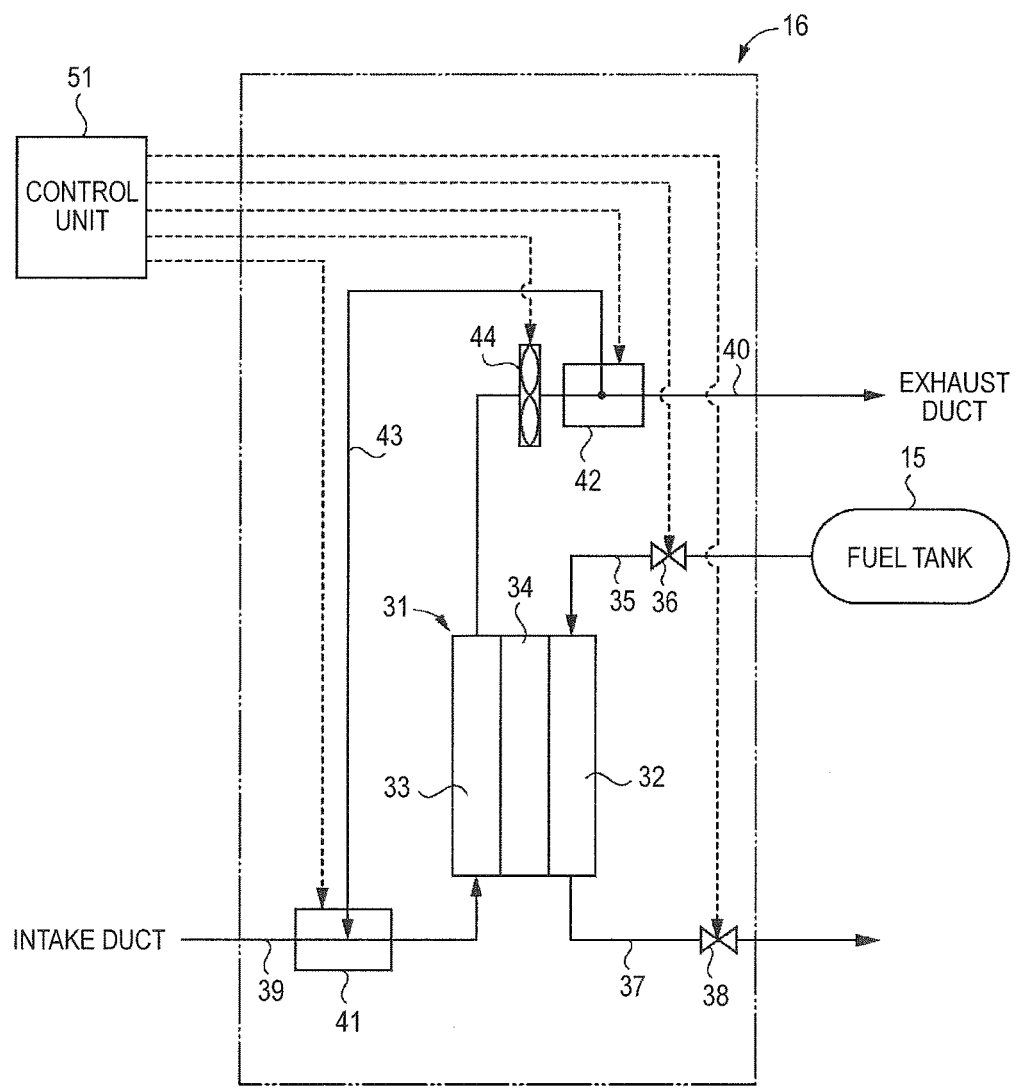
FIG. 3 is a circuit diagram showing a fuel cell device, a fuel tank and a control unit in the fuel cell motorcycle according to the first embodiment of the present invention.

FIG. 3 shows an interior structure of the fuel cell device 16 together with the fuel tank 15 and the control unit 51. As shown in FIG. 3, the fuel cell device 16 has the air-cooled type solid polymer fuel cell 31. The fuel cell 31 is a device configured to generate an electric power by a chemical reaction between hydrogen and oxygen and has a fuel cell stack constructed by stacking a plurality of cells on top of one another. In FIG. 3, for convenience of explanation, one of such cells is schematically shown as the fuel cell 31.

Each cell of the fuel cell 31 includes a fuel electrode 32, an air electrode (oxygen electrode) 33 and a solid polymer electrolyte film 34 and has a structure in which the electrolyte film 34 is arranged between the fuel electrode 32 and the air electrode 33. Also, although not shown, a diffusion layer and a catalyst layer are provided between the fuel electrode 32 and the electrolyte film 34, and also a diffusion layer and a catalyst layer are provided between the air electrode 33 and the electrolyte layer 34.

Hydrogen is supplied to the fuel electrolyte 32. Hydrogen molecules supplied to the fuel electrode 32 become activated hydrogen atoms and then hydrogen ions at the catalyst layer arranged between the fuel electrode 32 and the electrolyte film 34, and as a result emit electrons. The emitted electrons move to the air electrode 33 through an external circuit, not shown. Due to this movement of electrons, an electric current is supplied to the inverter 14 and the like connected to the external circuit and thus becomes an electric power for driving the motor 13 and the like. Further, the hydrogen ions, together with moisture contained in the electrolyte film 34, move from the fuel electrode 32 to the air electrode 33 through the electrolyte film 34.

On the other hand, air is supplied to the air electrode 33. Oxygen molecules of the air supplied to the air electrode 33 become oxygen ions by receiving electrons, which have moved from the fuel electrode 32 to the air electrode 33 through the external circuit, at the catalyst layer arranged between the air electrode 33 and the electrolyte film 34, and also the oxygen ions are bonded to the hydrogen ions, which have moved from the fuel electrode 32 to the air electrode 33 through the electrolyte film 34, to become water. A part of the water created in such a manner moves from the air electrode 33 to the fuel electrode 32 through the electrolyte film 34 due to concentration diffusion, thereby humidifying the electrolyte film 34.

The fuel tank 15 is connected to the fuel cell device 16. In the fuel cell device 16, a fuel supply path 35 is formed for supplying hydrogen stored in the fuel tank 15 to the fuel electrode 32 of each cell of the fuel cell 31. Also, on a middle of the fuel supply path 35, a pressure regulating valve 36 is provided for regulating a pressure of hydrogen to be supplied from the fuel tank 15 to the fuel electrode 32 of each cell. Also, in the fuel cell device 16, a water discharge path 37 is formed for discharging water created in each cell of the fuel cell 31 to the outside. In addition, on a middle of the water discharge path 37, a discharge valve 38 is provided for switching between communicating and blocking of a flow through the water discharge path 37.

Further, an air supply path 39 for supplying air, which is introduced from the outside through the intake port 18 and the intake duct 17 (see FIG. 2), to the air electrode 33 of each cell of the fuel cell 31, and an air discharge path 40 for discharging air, which has been supplied from the air supply path 39 and then passed through the air electrode 33 of each cell, to the outside through the exhaust duct 19 and the exhaust port 20 (see FIG. 2) are formed in the fuel cell device 16. Also, an inlet-side recirculation mechanism 41 is provided on a middle of the air supply path 39, and an outlet-side recirculation mechanism 42 is provided on a middle of the air discharge path 40. Additionally, an air circulation path 43 is provided between the inlet-side recirculation mechanism 41 and the outlet-side recirculation mechanism 42, and the air discharge path 40 and the air supply path 39 are connected to each other via the air circulation path 43. The air circulation path 43 is a path intended to return a part of air, which has discharged from the fuel cell 31, to the intake side of the fuel cell 31.

Further, a fan 44 is provided in the fuel cell device 16. The fan 44 creates a flow directed from the air supply path 39 to the air discharge path 40 through the air electrode 33 of each cell and a flow returned from the air discharge path 40 to the air supply path 39 through the air circulation path 43. Also, the inlet-side recirculation mechanism 41 is provided with a shutter configured to perform switching between communicating and blocking of a flow through the air supply path 39 and switching between communicating and blocking of a flow through the air circulation path 43. In addition, the outlet-side recirculation mechanism 42 is provided with a shutter configured to perform switching between communicating and blocking of a flow through the air discharge path 40 and switching between communicating and blocking of a flow through the air circulation path 43.

Further, the control unit 51 is electrically connected to the inlet-side recirculation mechanism 41, the outlet-side recirculation mechanism 42, the fan 44, the pressure regulating valve 36 and the discharge valve 38. Switching of the shutter of the inlet-side recirculation mechanism 41, switching of the shutter of the outlet-side recirculation mechanism 42, rotational driving of the fan 44, adjusting of opening and closing of the pressure regulating valve 36 or openness thereof, and adjusting of opening and closing of the discharge valve 38 or openness thereof are controlled by control signals from a control device 52 of the control unit 51.

Figure 4:
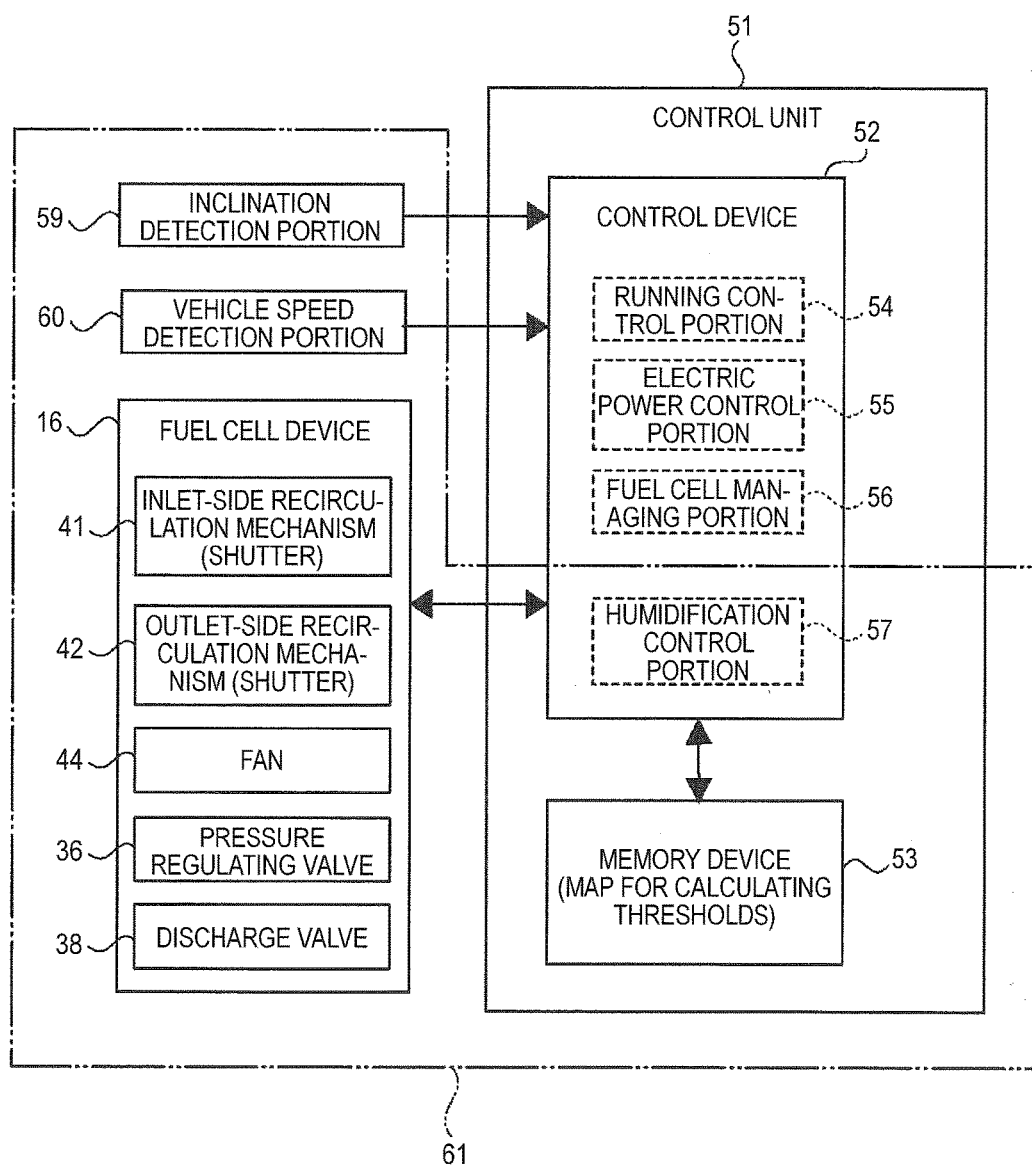
FIG. 4 is a block diagram showing the control unit and instruments connected to the control unit in the fuel cell motorcycle according to the first embodiment of the preset invention.

FIG. 4 shows the control unit 51 provided in the fuel cell motorcycle 1 and some of a plurality of instruments electrically connected to the control unit 51. As shown in FIG. 4, the control unit 51 includes the control device 52 having a CPU or the like, and a memory device 53 having, for example, a semiconductor memory element or the like. The control device 52 and the memory device 53 are electrically connected to each other. The control device 52 reads out and executes, for example, computer programs stored in the memory device 53, thereby serving as a running control portion 54, an electric power control portion 55, a fuel cell managing portion 56 and a humidification control portion 57. Also, the memory device 53 is stored with an inclination threshold map B (see FIG. 5).

In the control device 52, the running control portion 54 is configured to control running of the fuel cell motorcycle 1. Specifically, the running control portion 54 has a function of changing a rotation velocity of the motor 13 depending on an openness of an accelerator provided on the handle 8.

The electric power control unit 55 is configured to control supplying of an electric power to the motor 13. Specifically, the electric power control unit 55 has a function of controlling switching between supplying of an electric power from the fuel cell 31 to the motor 13 and supplying of an electric power from the secondary battery 21 to the motor 13 and the like.

The fuel cell managing portion 56 is configured to manage the fuel cell 31. Specifically, the fuel cell managing portion 56 has a function of detecting or predicting a wet condition of the electrolyte film 34 of each cell of the fuel cell 31 and then deciding whether or not a humidification treatment for humidifying the electrolyte film 34 of each cell needs to be performed on the basis of the result. If it is decided that the humidification treatment needs to be performed, the fuel cell managing portion 56 generates a demand signal of demanding to perform the humidification treatment.

Meanwhile, it will be understood that detection or prediction of the wet condition of the electrolyte film 34 of each cell can be performed in accordance with well-known methods on the basis of a transient response of an output voltage of the fuel cell 31 when an output current of the fuel cell 31 is changed, a capacitive component of each cell, a change in resistance of the fuel cell 31, an output value of the fuel cell 31 or a voltage of each cell.

The humidification control portion 57 is configured to carry out a humidification control process for the fuel cell 31. The humidification control process is a process for controlling performing of the humidification treatment to the fuel cell 31. The humidification control process according to the present embodiment is a process for deciding whether or not to permit to perform the humidification treatment on the basis of an inclination (bank angle) of the fuel cell motorcycle 1, a speed of the fuel cell motorcycle 1 and a humidification time, and also on the basis of the result of the decision, performing the humidification treatment (or continuing to perform the humidification treatment) if the humidification treatment is permitted to be performed, or not performing the humidification treatment (or stopping the humidification treatment) if the humidification treatment is not permitted to be performed.

The humidification treatment is a process for humidifying the electrolyte film 34 of each cell. In the humidification treatment, humidification of the electrolyte film 34 of the each cell is performed by operating the shutter of the inlet-side recirculation mechanism 41 and the shutter of the outlet-side recirculation mechanism 42 of the fuel cell device 16 to respectively close the air supply path 39 and the air discharge path 40 and also stopping the fan 44, so that discharge of vapor is inhibited and thus the vapor or a reaction water is stayed in the electrolyte film 34 of each cell. Further, in the humidification treatment, introduction of air is also inhibited in such a manner, thereby preventing a temperature of the fuel cell 31 from being excessively increased due to heat of reaction. In addition, in the humidification treatment, the pressure regulating valve 36 is closed to stop supplying hydrogen from the fuel tank 15 to the fuel electrode 32 of each cell, and also the discharge valve 38 is closed to stop discharging water from each cell.

Also, the humidification time is a duration of the humidification treatment. Namely, during operation of the fuel cell motorcycle 1, the humidification treatment is performed in a plurality of times, and thus when one humidification treatment is being performed at a certain measurement time, the humidification time is a period of time from immediately after the one humidification treatment is started until the measurement time.

Further, the control unit 51 is electrically connected to the inclination detection portion 59 for detecting a lateral inclination of the vehicle body of the fuel cell motorcycle 1, a vehicle speed detection portion 60 for detecting a running speed of the fuel cell motorcycle 1, and the fuel cell device 16 (specifically, the inlet-side recirculation mechanism 41, the outlet-side recirculation mechanism 42, the fan 44, the pressure regulating valve 36, the discharge valve 38 and the like).

As the inclination detection portion 59, well-known inclination sensors may be employed. As described above, the inclination detection portion 59 is attached, for example, on the upper side of the front portion of the fuel cell motorcycle 1 (see FIG. 2). The inclination detection portion 59 outputs a detected signal, which represents an inclination of the fuel cell motorcycle 1, to the control device 52 of the control unit 51.

The vehicle speed detection portion 60 is configured to detect a speed of the fuel cell motorcycle 1, for example, on the basis of a direct current applied to the inverter 14. Namely, the running control portion 54 is configured to change a rotation velocity of the motor 13 by changing a direct current to be applied to the inverter 14 connected to the motor 13, depending on an openness of the accelerator (throttle) provided on the handle 8. The vehicle speed detection portion 60 is configured to detect a speed of the fuel cell motorcycle 1 using the direct current. Alternatively, as a vehicle speed detection method, a method of detecting rotation of the motor 13 or a power transmission mechanism by a rotation sensor or the like may be employed. The vehicle speed detection portion 60 outputs a detected signal, which represents a speed of the fuel cell motorcycle 1, to the control device 52 of the control unit 51.

As shown in FIG. 4, the fuel cell humidification device 61 according to the first embodiment of the present invention is at least constituted of the humidification control portion 57, the memory device 53, the inclination detection portion 59 and the vehicle speed detection portion 60 in the control device 52 and the inlet-side recirculation mechanism 41, the outlet-side recirculation mechanism 42, the pressure regulating valve 36 and the discharge valve 38 in the fuel cell device 16.

Now, the humidification control process carried out by the humidification control portion 57 will be described in detail. The humidification control portion 57 starts a routine of the humidification control process during operation of the fuel cell motorcycle 1, for example, in a periodic manner. When the routine of the humidification control process has been started, if the fuel cell managing portion 56 demands to perform the humidification treatment or the humidification treatment is being performed, the humidification control unit 57 decides whether or that an inclination of the fuel cell motorcycle 1 detected by the inclination detection portion 59 is equal to or greater than an inclination threshold. The inclination threshold is a threshold on inclination of the fuel cell motorcycle 1.

On the basis of the decision, the humidification control portion 57 permits to perform or continue to perform the humidification treatment if the inclination of the fuel cell motorcycle 1 is not equal to or greater than the inclination threshold. Namely, if the humidification treatment is not being performed at that time, the humidification treatment is started, and also if the humidification treatment is being performed at that time, the humidification treatment is continuously performed.

On the other hand, if the inclination of the fuel cell motorcycle 1 is equal to or greater than the inclination threshold, the humidification control portion 57 does not permit to perform or continue to perform the humidification treatment. Namely, if the humidification treatment is not being performed at that time, the humidification treatment is not performed, and also if the humidification treatment is being performed at that time, the humidification treatment is stopped.

Due to the humidification control process as described above, the humidification treatment is not performed or is stopped if the inclination of the fuel cell motorcycle 1 is equal to or greater than the inclination threshold upon cornering of the fuel cell motorcycle 1. Accordingly, a state where an output of the motor 13 can be sufficiently increased instantly in response to opening of the accelerator by a driver upon cornering can be kept. Therefore, stability of running can be ensured upon cornering.

In other words, during performing of the humidification treatment, the fuel cell 31 becomes a state where generation of electricity is almost stopped. Accordingly, if the humidification treatment is being performed upon cornering, it is difficult to increase an output of the motor 13 by supplying an electric power from the fuel cell 31 thereto to correspond to operation of the accelerator. As a result, it is difficult to restore a balance of the inclined vehicle body by operation of the accelerator. However, according to the fuel cell motorcycle 1 of the present embodiment, the humidification treatment is not performed or is stopped if the inclination of the fuel cell motorcycle 1 is equal to or greater than the inclination threshold upon cornering, thereby ensuring a state where a balance of the vehicle body inclined due to cornering can be restored by operation of the accelerator.

Further, in the humidification control process, the inclination threshold used to decide the inclination of the fuel cell motorcycle 1 is varied in accordance with a speed of the fuel cell motorcycle 1 detected by the vehicle speed detection portion 60. Varying of the inclination threshold in accordance with a speed of the fuel cell motorcycle 1 can be for example determined in consideration of the followings.

In other words, during performing of the humidification treatment, because the fuel cell 31 becomes a state where generation of electricity is almost stopped, it is difficult to drive the motor 13 with an electric power from the fuel cell 31. However, the motor 13 can be driven with an electric power from the secondary battery 21. Originally, the secondary battery 21 is a substitute electric power source for the motor 13, and thus an amount of electric power capable of being supplied to the motor 13 therefrom is limited. Accordingly, the humidification treatment upon cornering is permitted under a condition that an amount of electric power, which has to be supplied to the motor 13 in accordance with operation of the accelerator in order to balance the vehicle body inclined due to cornering, falls within a range not exceeding an amount of electric power capable of being supplied to the motor 13 from the secondary battery 21. When the condition is satisfied, stability of running can be ensured by driving the motor 13 with an electric power from the secondary battery 21, even if the humidification treatment is permitted to be performed upon cornering.

In this case, as the inclination of the fuel cell motorcycle 1 is increased upon cornering of the fuel cell motorcycle 1, an openness of the accelerator required to balance the vehicle body tends to be increased or a period of time during which the accelerator is opened tends to be increased. Namely, as the inclination of the fuel cell motorcycle 1 is increased, an amount of electric power, which has to be supplied to the motor 13 in accordance with operation of the accelerator in order to balance the vehicle body inclined due to cornering, is increased. If this point is considered, a range of inclination of the fuel cell motorcycle 1, within which even if the humidification treatment is performed upon cornering, stability of running can be ensured by driving the motor 13 with an electric power from the secondary battery 21, can be determined.

Also, the range of inclination can be varied in accordance with a speed of the fuel cell motorcycle 1. Now, that the range of inclination of the fuel cell motorcycle 1, within which stability of running can be ensured by driving the motor 13 with an electric power from the secondary battery 21 upon cornering, is varied in accordance with a speed of the fuel cell motorcycle 1 is specifically considered from two standpoints.

First, as the speed of the fuel cell motorcycle 1 is increased, the number of rotation of the motor 13 is increased and thus an amount of electric power, which has to be supplied to the motor 13, is also increased. Accordingly, as the speed of the fuel cell motorcycle 1 is increased, the range of inclination of the fuel cell motorcycle 1, within which stability of running can be ensured by driving the motor 13 with an electric power from the secondary battery 21 upon cornering, becomes narrow. For this reason, as the speed of the fuel cell motorcycle 1 is increased, the inclination threshold is preferably set to be smaller.

Meanwhile, when the speed of the fuel cell motorcycle 1 is, for example, a very low speed, such as about 5 km, running can be easily unstable and also even if the inclination of the fuel cell motorcycle 1 due to cornering is small, the accelerator is likely to have to be largely opened in order to balance the vehicle body. Accordingly, when the speed of the fuel cell motorcycle 1 is a very low speed, an amount of electric power, which has to be supplied to the motor 13 in accordance with operation of the accelerator in order to balance the vehicle body, is increased even if a degree of inclination of the fuel cell motorcycle 1 is small. Therefore, when the speed of the fuel cell motorcycle 1 is a very low speed, the range of inclination of the fuel cell motorcycle 1, within which stability of running can be ensured by driving the motor 13 with an electric power from the secondary battery 21 upon cornering, becomes narrow. For this reason, when the speed of the fuel cell motorcycle 1 is a very low speed, the inclination threshold is preferably set to be smaller.

According to the present embodiment, the two points as described above are combined so that in a very low-speed range of the fuel cell motorcycle 1, the inclination threshold is set to be smaller, and in ranges other than that, the inclination threshold becomes small as the speed of the when the speed of the fuel cell motorcycle 1 is increased. In this way, by varying the inclination threshold in accordance with a speed of the fuel cell motorcycle 1 detected by the vehicle speed detection portion 60, an opportunity to perform the humidification treatment can be increased and an opportunity to humidify the electrolyte film 34 of each cell of the fuel cell 31 can be increased, as compared with a case where the humidification treatment is indiscriminately prohibited from being performed upon cornering of the fuel cell motorcycle 1.

Further, in the humidification control process, if the humidification treatment is being performed, the inclination threshold is set to be smaller as the humidification time becomes long. Namely, if the humidification time is short, decision is carried out using a larger inclination threshold than an inclination threshold used when the humidification time is longer, so that the humidification treatment can be stopped only when the fuel cell motorcycle 1 is largely inclined. In other words, even when the fuel cell motorcycle 1 is inclined during a short humidification time, the humidification treatment is continuously performed if a degree thereof is small.

Further, if the fuel cell motorcycle 1 is inclined small during a short humidification time and correspondingly, a driver opens the accelerator in order to balance the vehicle body, an output of the motor 13 can be increased using an electric power from the secondary battery 21. Namely, if the inclination of the fuel cell motorcycle 1 is small, an openness of the accelerator for balancing the vehicle body is small or a period of time, during which the accelerator is opened, is short. Accordingly, an amount of electric power which has to be supplied to the motor 13 is small, so that an increase in output of the motor 13 in accordance with operation of the accelerator by the driver can be obtained by an electric power from the secondary battery 21. So long as an increase in output of the motor 13 in accordance with operation of the accelerator by the driver can be obtained by an electric power from the secondary battery 21, the humidification treatment is continuously performed.

In this way, when the fuel cell motorcycle 1 is inclined small during a short humidification time, the humidification treatment is continuously performed so that a situation where the humidification treatment is stopped with a short duration can be inhibited from being frequently occurred and thus an opportunity to humidify the electrolyte film 34 of each cell of the fuel cell 31 can be increased.

In other words, because the humidification treatment has a long preparation time from after the humidification treatment is started until an actual humidification to the electrolyte film 34 is performed (e.g., an operation time taken to close the shutters), only preparation and stop of the humidification treatment are repeated if a situation where the humidification treatment is stopped with a short duration is frequently occurred. Accordingly, a state where humidification to the electrolyte film 34 is not actually performed is likely to continue for a long time. According to the present embodiment, it is possible to inhibit such a state from being occurred and thus to achieve an early and reliable humidification to the electrolyte film 34.

According to the present embodiment, a processing of varying the inclination threshold in accordance with a speed of the fuel cell motorcycle 1 and a processing of lowering the inclination threshold as the humidification time becomes long are achieved by a processing of selecting one inclination threshold from a plurality of inclination thresholds in an inclination threshold map B (see FIG. 5).

FIG. 5 shows the inclination threshold map B used in the humidification treatment. In order to achieve the processing of varying the inclination threshold in accordance with a speed of the fuel cell motorcycle 1 and the processing of lowering the inclination threshold as the humidification time becomes long as described above, appropriate inclination thresholds in accordance with speeds of the fuel cell motorcycle 1 and humidification times are previously determined by experiments, simulations or the like previously performed. In the inclination threshold map B of FIG. 5, inclination thresholds determined in such a manner are previously arrayed to be associated with speeds of the fuel cell motorcycle 1 and humidification times. In FIG. 5, a numerical value of each inclination threshold in the inclination threshold map B is an absolute value of inclination of the fuel cell motorcycle 1 and a unit thereof is degree. 0 degree means that the fuel cell motorcycle 1 is in a vertical state.

As seen in FIG. 5, inclination thresholds in the inclination threshold map B are small if a speed of the fuel cell motorcycle 1 is higher than 0 km and equal to or lower than 5 km. Also, if a speed of the fuel cell motorcycle 1 is higher than 5 km, inclination thresholds become small as the speed is increased. Further, in the inclination threshold map B, inclination thresholds become small as the humidification time becomes long.

Figure 6:
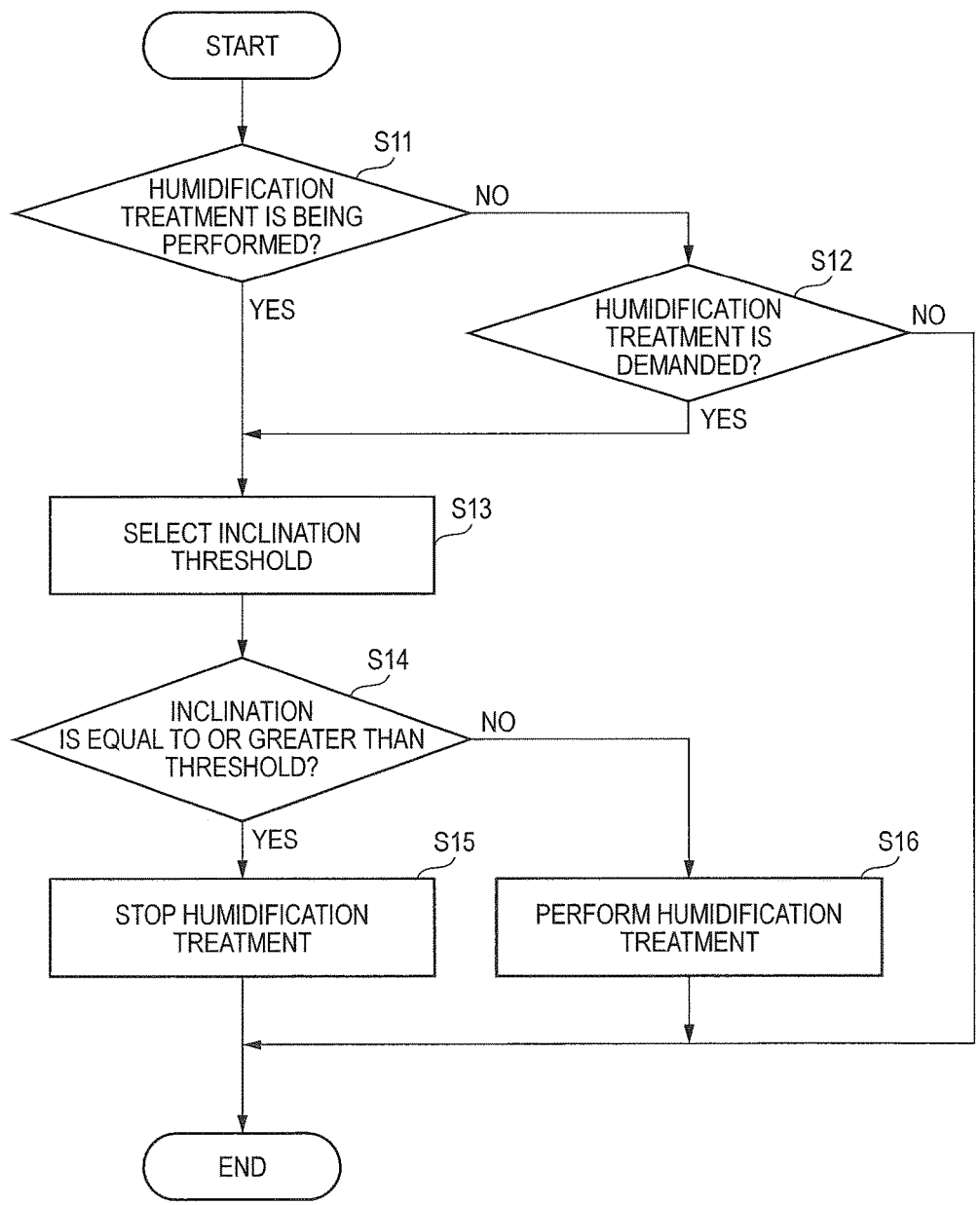
FIG. 6 is a flow chart showing a humidification control process in the fuel cell motorcycle according to the first embodiment of the present invention.

FIG. 6 shows a detailed flow of the humidification control process. The humidification control portion 57 carries out the humidification control process shown in FIG. 6 during operation of the fuel cell motorcycle 1, for example, in a periodic manner.

In the humidification control process, first, the humidification control portion 57 decides whether or not the humidification treatment is being performed (step S11). The humidification control portion 57 has a function of recording on a flag whether or not the humidification treatment is being performed. On the basis of the flag, the humidification control portion 57 decides whether or not the humidification treatment is being performed.

When the humidification treatment is not being performed (step S11: NO), then the humidification control portion 57 decides whether or not the fuel cell managing portion 56 demands to perform the humidification treatment, for example, on the basis of a demand signal transmitted from the fuel cell managing portion 56 (step S12).

When the humidification treatment is not demanded (step S12: NO), the humidification control portion 57 ends the current humidification control process.

On the other hand, when the humidification treatment is being performed (step S11: YES) or when the humidification treatment is demanded (step S12: YES), the humidification control portion 57 selects an inclination threshold on the basis of a speed of the fuel cell motorcycle 1 and a humidification time with reference to the inclination threshold map B (step S13).

At this time, the humidification control portion 57 can recognize the speed of the fuel cell motorcycle 1 on the basis of a detected signal outputted from the vehicle speed detection portion 60. Also, the humidification control portion 57 has a function of measuring the humidification time using a timer equipped in the control device 52. Measuring the humidification time is carried out independently of the humidification control process. The humidification control portion 57 can recognize the humidification time with such a function. Meanwhile, if the humidification treatment is not being performed, the humidification control portion 57 recognizes the humidification time as 0.

For example, as shown in FIG. 5, if the speed of the fuel cell motorcycle 1 is higher than 5 km and equal to or lower than 10 km, for example, 8 km, and also the humidification time is longer than 5 seconds and equal to or shorter than 10 seconds, for example, 8 seconds, the humidification control portion 57 selects an inclination threshold of 15 degrees from the inclination threshold map B.

Subsequently, the humidification control portion 57 decides whether or not an inclination of the fuel cell motorcycle 1 is equal to or greater than the selected inclination threshold (step S14). At this time, the humidification control portion 57 recognizes the inclination of the fuel cell motorcycle 1 on the basis of a detected signal outputted from the inclination detection portion 59.

When the inclination of the fuel cell motorcycle 1 is equal to or greater than the selected inclination threshold (step S14: YES), the humidification control portion 57 does not perform the humidification treatment if the humidification treatment is not being performed at that time, and stops the humidification treatment if the humidification treatment is being performed at that time (step S15).

If the humidification treatment is stopped at the step S15, the humidification control portion 57 outputs control signals for opening the shutter of the inlet-side recirculation mechanism 41 and the shutter of the outlet-side recirculation mechanism 42 of the fuel cell device 16, driving the fan 44 and opening the pressure regulating valve 36 and the discharge valve 38, respectively, to the inlet-side recirculation mechanism 41, the outlet-side recirculation mechanism 42, the fan 44, the pressure regulating valve 36 and the discharge valve 38. Then, the humidification control portion 57 ends the current humidification control process after outputting the control signals. On the other hands, if the humidification treatment is not performed at the step S15, the humidification control portion 57 only maintains the current situation, and thus in this case, the humidification control portion 57 ends the current humidification control process immediately after decision at the step S14.

Contrarily, when the inclination of the fuel cell motorcycle 1 is not equal to or greater than the selected inclination threshold (step S14: NO), the humidification control portion 57 starts to perform the humidification treatment if the humidification treatment is not being performed at that time, and continues to perform the humidification treatment if the humidification treatment is being performed at that time (step S16).

If the humidification treatment is started at the step S16, the humidification control portion 57 outputs control signals for closing the shutter of the inlet-side recirculation mechanism 41 and the shutter of the outlet-side recirculation mechanism 42 of the fuel cell device 16, stopping the fan 44 and closing the pressure regulating valve 36 and the discharge valve 38, respectively, to the inlet-side recirculation mechanism 41, the outlet-side recirculation mechanism 42, the fan 44, the pressure regulating valve 36 and the discharge valve 38. Then, the humidification control portion 57 ends the current humidification control process after outputting the control signals. On the other hands, if the humidification treatment is continuously performed at the step S16, the humidification control portion 57 only maintains the current situation, and thus in this case, the humidification control portion 57 ends the current humidification control process immediately after decision at the step S14.

Further, the humidification control portion 57 turns off the flag, which represents whether or not the humidification treatment is being performed, for example, when a control of stopping the humidification treatment is carried out at the step S15, and turns on the flag when a control of starting the humidification treatment is carried out at the step S16.

Second Embodiment

Figure 7:
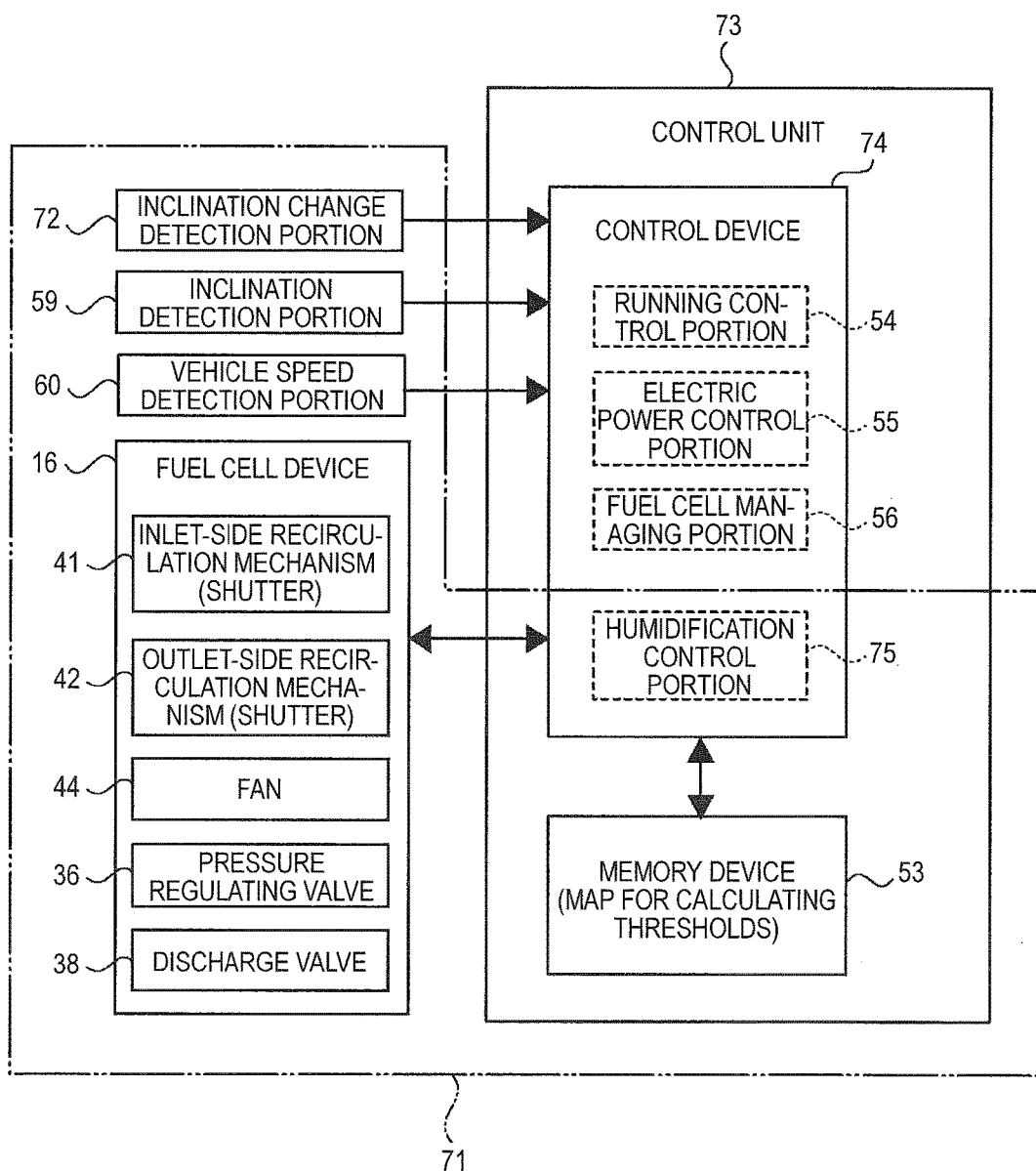
FIG. 7 is a block diagram showing a control unit and instruments connected to the control unit in a fuel cell motorcycle according to a second embodiment of the preset invention.
Figure 8:
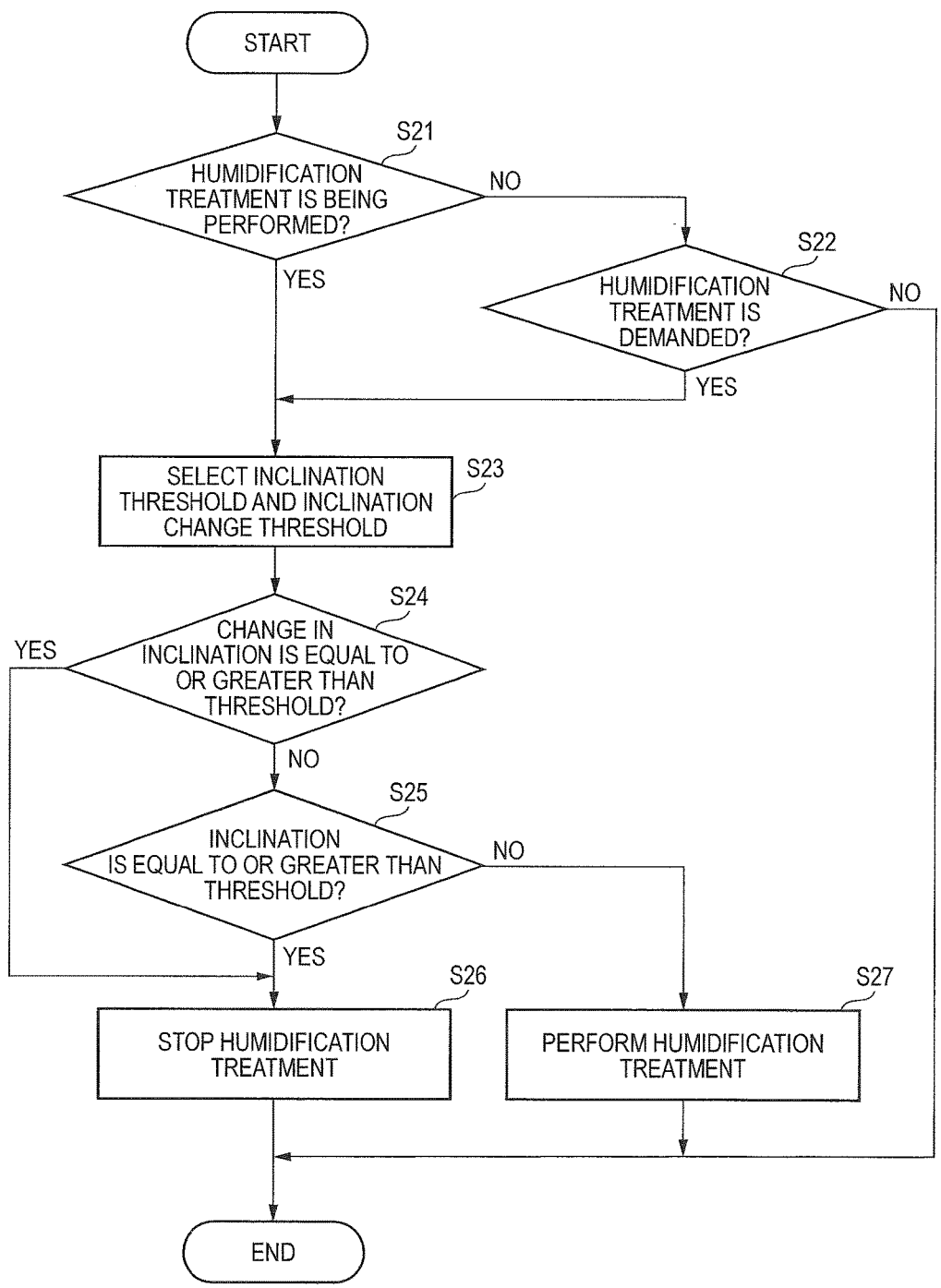
FIG. 8 is a flow chart showing a humidification control process in the fuel cell motorcycle according to the second embodiment of the present invention.

FIG. 7 shows a control unit 51 of a fuel cell motorcycle according to the second embodiment and some of a plurality of instruments electrically connected to the control unit. FIG. 8 shows a humidification control process according to the second embodiment. Meanwhile, the same components in FIG. 7 as the components of the first embodiment shown in FIG. 4 are designated by the same reference numerals, and the description thereof will be omitted.

As shown in FIG. 7, a fuel cell humidification device 71 of a fuel cell motorcycle according to the second embodiment of the present invention includes an inclination change detection portion 72 for detecting a change per unit time in lateral inclination (angular velocity) of a vehicle body of the fuel cell motorcycle. The inclination change detection portion 72 is, for example, an angular velocity sensor, and is attached on an upper side of a front portion of the fuel cell motorcycle. The inclination change detection portion 72 outputs a detected signal, which represents a change per unit time in inclination of the fuel cell motorcycle, to a control device 74 of a control unit 73.

Also, in a humidification control process of the fuel cell motorcycle according to the second embodiment, a humidification control portion 75 decides whether or not the change per unit time in inclination of the fuel cell motorcycle detected by the inclination change detection portion 72 is equal to or greater than an inclination change threshold, if the fuel cell managing portion 56 demands to perform a humidification treatment or a humidification treatment is being performed. When the change per unit time in inclination of the fuel cell motorcycle is equal to or greater than the inclination change threshold, the humidification control portion 75 does not permit to perform or continue to perform the humidification treatment.

Herein, the inclination change threshold is a threshold on change in lateral inclination of the vehicle body of the fuel cell motorcycle. The inclination change threshold is a value representing a change in inclination, at which an inclination of the fuel cell motorcycle is rapidly increased and thus a situation in which the inclination of the fuel cell motorcycle instantaneously will become equal to or greater than the inclination threshold is expected. The inclination change threshold is plurally set to respectively correspond to a plurality of inclination thresholds shown in FIG. 5, and such a plurality of inclination change thresholds are previously stored in the memory device 53.

As shown in FIG. 8, in the humidification control process according to the second embodiment, the humidification control portion 75 first decides whether or not the humidification treatment is being performed, on the basis of a flag representing whether or not the humidification treatment is being performed (step S21). When the humidification treatment is not being performed, the humidification control portion 75 decides whether or not the humidification treatment is demanded, on the basis of a demand signal transmitted from the fuel cell managing portion 56 (step S22). When the humidification treatment is not demanded, the humidification control portion 75 ends the current humidification control process.

On the other hand, when the humidification treatment is being performed or when the humidification treatment is demanded, the humidification control portion 75 selects an inclination threshold on the basis of a speed of the fuel cell motorcycle and a humidification time with reference to the inclination threshold map B of FIG. 5 (step S23). Also, at the step S23, the humidification control portion 75 selects an inclination change threshold corresponding to the selected inclination threshold.

Subsequently, the humidification control portion 75 recognizes a change per unit time in inclination of the fuel cell motorcycle on the basis of a detected signal from the inclination change detection portion 72 and decides whether or not the change per unit time in inclination of the fuel cell motorcycle is equal to or greater than the selected inclination change threshold (step S24).

When the change per unit time in inclination of the fuel cell motorcycle is equal to or greater than the selected inclination change threshold (step S24: YES), the humidification control portion 75 causes the process to proceed into a step S26 without comparing the inclination of the fuel cell motorcycle with the selected inclination threshold. Then, at the step S26, the humidification control portion 75 does not perform the humidification treatment if the humidification treatment is not being performed at that time, and stops the humidification treatment if the humidification treatment is being performed at that time. Then, the humidification control portion 75 ends the current humidification control process.

Contrarily, when the change per unit time in inclination of the fuel cell motorcycle is not equal to or greater than the selected inclination change threshold (step S24: NO), the humidification control portion 75 decides whether or not the inclination of the fuel cell motorcycle is equal to or greater than the selected inclination threshold (step S25). Subsequently, when the inclination of the fuel cell motorcycle is equal to or greater than the selected inclination threshold, the humidification control portion 75 does not perform the humidification treatment if the humidification treatment is not being performed at that time, and stops the humidification treatment if the humidification treatment is being performed at that time (step S26). Then, the humidification control portion 75 ends the current humidification control process. On the other hand, when the inclination of the fuel cell motorcycle is not equal to or greater than the selected inclination threshold (step S25: NO), the humidification control portion 75 starts to perform the humidification treatment if the humidification treatment is not being performed at that time, and continues to perform the humidification treatment if the humidification treatment is being performed at that time (step S27). Then, the humidification control portion 75 ends the current humidification control process.

When an inclination of the fuel cell motorcycle is rapidly increased upon cornering, it is expected that the inclination of the fuel cell motorcycle will be instantaneously increased so that a balance of the vehicle body is greatly damaged. In this case, it is expected that a driver will instantly largely open the accelerator in order to balance the vehicle body. According to the second embodiment of the present invention, a change per unit time in inclination of the fuel cell motorcycle is detected and whether or not the detected change per unit time in inclination is equal to or greater than an inclination change threshold is decided, so that it can be recognized that the fuel cell motorcycle is rapidly inclined. Then, when the fuel cell motorcycle is rapidly inclined, the humidification treatment is not performed or is stopped to allow an electric power from the fuel cell 31 to be supplied to the motor 13, thereby ensuring a state where an output of the motor can be sufficiently increased in accordance with operation of the accelerator.

Further, according to the second embodiment of the present invention, the humidification treatment can be prevented from being started or be stopped in a case where even if the inclination of the fuel cell motorcycle is small, it is expected that the inclination of the fuel cell motorcycle will become large due to a rapid increase in inclination of the fuel cell motorcycle. In this way, because the humidification treatment can be prevented from being started or be stopped in a phase before the inclination of the fuel cell motorcycle actually becomes large, a state where an output of the motor can be sufficiently increased in accordance with operation of the accelerator can be early ensured, thereby enhancing stability of running and reliability of driving operation.

Meanwhile, although in each of the foregoing embodiments, a case where one inclination threshold is selected from the inclination threshold map B having a plurality of inclination thresholds previously arrayed therein on the basis of a speed of the fuel cell motorcycle and a humidification time has been described by way of example, the present invention is not limited to that. For example, instead of the inclination threshold map B, an inclination threshold calculation expression may be provided so that an inclination threshold can be calculated by inputting a speed of the fuel cell motorcycle and a humidification time to the inclination threshold calculation expression and then performing calculation.

Further, although in each of the foregoing embodiments, a case where the inclination threshold is determined with a speed of the fuel cell motorcycle and a humidification time has been described, the inclination threshold may be determined with only the speed of the fuel cell motorcycle. In this case, the effect that stability of running is ensured upon cornering is achieved although an opportunity to perform the humidification treatment is reduced. Also, decision on whether or not the humidification treatment is performed may be carried out using one inclination threshold, for example, by limiting a speed range, within which the humidification treatment is performed, to a predetermined range (e.g., from 0 km to 30 km). Therefore, simplification of the humidification control process can be achieved. Also, in the humidification control process of the second embodiment, decision on whether or not the humidification treatment is performed may be carried out using one inclination change threshold.

Also, a position of the fuel tank 15 or fuel cell 31 in the fuel cell motorcycle according to each of the foregoing embodiments is just an example. For example, the fuel tank may be arranged on the rear portion of the vehicle body and the fuel cell may be arranged on the middle portion of the vehicle body in the front and rear direction. Similarly, a position of the inclination detection portion 59 or control unit 51 is just an example, and thus these instruments may be arranged at other locations on the vehicle. Further, the humidification treatment method is an example, and thus other methods may be employed as a humidification treatment method. In addition, the present invention may be applied to various types of motorcycles. Also, the present invention may be applied to other vehicles, of which a vehicle body is inclined upon cornering and thus stability of running is reduced.

Further, in each of the foregoing embodiments, the electric power control portion 55 is a specific example of an electric power control device, and the fuel cell managing portion 56 is a specific example of a fuel cell managing device. Also, the inlet-side recirculation mechanism 41, the outlet-side recirculation mechanism 42, the pressure regulating valve 36 and the discharge valve 38 in the fuel cell device 16 is a specific example of a humidification performing portion, and the humidification control portion 57 (75) in the control device 52 (74) is a specific example of an humidification time measuring portion and a humidification permission deciding portion.

In addition, the present invention can be appropriately modified without departing from the scope and spirit of the invention which can be read from the appended claims and the entire specification, and thus the fuel cell humidification device and the fuel cell motorcycle involving such modifications are also encompassed by the technical spirit of the present invention.

What is claimed is:

1. A fuel cell humidification device of a fuel cell motorcycle, the fuel cell motorcycle comprising:
    a frame forming a skeleton of the fuel cell motorcycle;
    a driving wheel for driving the fuel cell motorcycle;
    a steerable wheel for changing a running direction of the fuel cell motorcycle;
    a fuel tank supported on the frame and configured to store hydrogen;
    an air-cooled type solid polymer fuel cell supported on the frame and having a fuel electrode, an air electrode and an electrolyte film;
    a secondary battery supported on the frame;
    a motor supported on the frame and configured to be operated with an electric power supplied from the fuel cell or the secondary battery and to drive the driving wheel;
    an electric power control device configured to control supplying of an electric power from the fuel cell to the motor and supplying of an electric power from the secondary battery to the motor; and
    a fuel cell managing device configured to detect or predict a wet condition of the electrolyte film of the fuel cell and then on the basis of the detection or prediction result, demand to perform a humidification treatment for humidifying the electrolyte film of the fuel cell, and
    the fuel cell humidification devices comprising:
    a humidification performing portion configured to perform the humidification treatment;
    an inclination detection portion configured to detect an inclination of the fuel cell motorcycle; and
    a humidification permission deciding portion configured to decide whether or not to permit to perform the humidification treatment, on the basis of the inclination of the fuel cell motorcycle, detected by the inclination detection portion,
    wherein when the fuel cell managing device demands to perform the humidification treatment or the humidification treatment is being performed, the humidification permission deciding portion decides whether or not the inclination of the fuel cell motorcycle, detected by the inclination detection portion is equal to or greater than an inclination threshold, and then permits to perform or continue to perform the humidification treatment if the inclination of the fuel cell motorcycle is not equal to or greater than the inclination threshold, and does not permit to perform or continue to perform the humidification treatment if the inclination of the fuel cell motorcycle is equal to or greater than the inclination threshold.

2. The fuel cell humidification device according to claim 1, further comprising a humidification time measuring portion configured to measure a humidification time which is a duration of the humidification treatment,
    wherein in a case where the humidification treatment is being performed, when deciding whether or not to permit to continue to perform the humidification treatment on the basis of the inclination of the fuel cell motorcycle, detected by the inclination detection portion, the humidification permission deciding portion causes the inclination threshold to be used in the decision to become smaller as the humidification time measured by the humidification time measuring portion becomes longer.

3. The fuel cell humidification device according to claim 1, further comprising a vehicle speed detection portion configured to detect a speed of the fuel cell motorcycle, wherein in a case where the fuel cell managing device demands to perform the humidification treatment or the humidification treatment is being performed, when deciding whether or not to perform or continue to perform the humidification treatment on the basis of the inclination of the fuel cell motorcycle, detected by the inclination detection portion, the humidification permission deciding portion varies the inclination threshold to be used in the decision in accordance with the speed of the fuel cell motorcycle, detected by the vehicle speed detection portion.

4. The fuel cell humidification device according to claim 3, further comprising a humidification time measuring portion configured to measure a humidification time which is a duration of the humidification treatment, wherein in a case where the humidification treatment is being performed, when deciding whether or not to permit to continue to perform the humidification treatment on the basis of the speed of the fuel cell motorcycle, detected by the vehicle speed detection portion and the inclination of the fuel cell motorcycle, detected by the inclination detection portion, the humidification permission deciding portion causes the inclination threshold to be used in the decision to become smaller as the humidification time measured by the humidification time measuring portion becomes longer.

5. The fuel cell humidification device according to claim 1, further comprising an inclination change detection portion configured to detect a change per unit time in inclination of the fuel cell motorcycle, wherein when the fuel cell managing device demands to perform the humidification treatment or the humidification treatment is being performed, the humidification permission deciding portion decides whether or not the change per unit time in inclination of the fuel cell motorcycle, detected by the inclination change detection portion is equal to or greater than an inclination change threshold, and then does not permit to perform or permit to continue to perform the humidification treatment if the change per unit time in inclination of the fuel cell motorcycle is equal to or greater than the inclination change threshold.

6. A fuel cell motorcycle comprising the fuel cell humidification device according to claim 1.

* * * * *